(12) United States Patent
Dehamel

(10) Patent No.: US 12,086,094 B2
(45) Date of Patent: Sep. 10, 2024

(54) APPARATUS AND METHOD FOR COMMUNICATION ON A SERIAL BUS

(71) Applicant: STMicroelectronics (Grenoble 2) SAS, Grenoble (FR)

(72) Inventor: Arnaud Dehamel, Monestier de Clermon (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 17/012,984

(22) Filed: Sep. 4, 2020

(65) Prior Publication Data
US 2021/0073168 A1    Mar. 11, 2021

(30) Foreign Application Priority Data

Sep. 10, 2019 (FR) ...................................... 1909970

(51) Int. Cl.
| | |
|---|---|
| *G06F 13/42* | (2006.01) |
| *G06F 1/3237* | (2019.01) |
| *G06F 9/4401* | (2018.01) |
| *G06F 9/54* | (2006.01) |
| *G06F 11/30* | (2006.01) |

(52) U.S. Cl.
CPC ........ *G06F 13/4295* (2013.01); *G06F 1/3237* (2013.01); *G06F 9/4418* (2013.01); *G06F 9/546* (2013.01); *G06F 11/3027* (2013.01); *G06F 13/4291* (2013.01)

(58) Field of Classification Search
CPC .... G06F 1/3203; G06F 13/16; G06F 13/4027; G06F 13/4068; G06F 9/3802; G06F 9/3814; G06F 1/189; G06F 1/324; G06F 1/3287

USPC ................................ 713/300, 320, 324, 322
See application file for complete search history.

(56) References Cited

U.S. PATENT DOCUMENTS

| | | | | |
|---|---|---|---|---|
| 5,247,655 A | * | 9/1993 | Khan | ..................... G11C 11/406 365/228 |
| 5,402,394 A | * | 3/1995 | Turski | ....................... G06F 1/14 368/10 |
| 5,617,309 A | * | 4/1997 | Abert | .................... G06F 13/368 700/4 |

(Continued)

FOREIGN PATENT DOCUMENTS

| | | |
|---|---|---|
| CN | 104238489 A | 12/2014 |
| CN | 106776436 A | 5/2017 |
| EP | 1253521 A2 | 10/2002 |

OTHER PUBLICATIONS

"CAN Specification", Sep. 1991, Robert Bosch GmbH, Version 2.0.*

(Continued)

*Primary Examiner* — Faisal M Zaman
(74) *Attorney, Agent, or Firm* — Slater Matsil, LLP

(57) ABSTRACT

The present disclosure relates to a method of communication via serial bus, comprising: the conveyance by the serial bus of a frame comprising at least two consecutive cycles of a dominant state followed by a recessive state, the recessive states and dominant states having durations comprised between 2 and 5 times the duration of a data bit conveyed by the serial bus, and preferably above 1.8 μs; and the detection by one or more circuits coupled to the serial bus of at least a part of the frame for triggering the passage from a sleep state to a wake state of the one or more circuits.

18 Claims, 8 Drawing Sheets

(56) References Cited

U.S. PATENT DOCUMENTS

| | | | | |
|---|---|---|---|---|
| 6,567,921 | B1* | 5/2003 | Guziak | G06F 1/3203 |
| | | | | 713/601 |
| 6,618,791 | B1* | 9/2003 | Dodd | G06F 1/3275 |
| | | | | 711/105 |
| 6,735,454 | B1* | 5/2004 | Yu | H04W 52/0293 |
| | | | | 455/343.1 |
| 6,737,968 | B1* | 5/2004 | Ergun | G07C 9/00182 |
| | | | | 340/12.54 |
| 9,258,244 | B1* | 2/2016 | Boyd | H04L 1/0002 |
| 10,172,092 | B1* | 1/2019 | Zhou | G06F 1/08 |
| 10,218,535 | B2* | 2/2019 | Zwart | H04L 12/40013 |
| 2003/0053573 | A1* | 3/2003 | Bree | G06F 13/4291 |
| | | | | 375/355 |
| 2006/0146970 | A1* | 7/2006 | Kato | G06F 1/3203 |
| | | | | 375/369 |
| 2008/0276107 | A1 | 11/2008 | Bogavac | |
| 2009/0172458 | A1* | 7/2009 | Yamada | G06F 1/3237 |
| | | | | 713/600 |
| 2010/0201399 | A1* | 8/2010 | Metzner | H04L 25/028 |
| | | | | 326/83 |
| 2011/0038388 | A1* | 2/2011 | Hartwich | G06F 1/12 |
| | | | | 370/503 |
| 2011/0261907 | A1* | 10/2011 | Lee | H04W 52/0229 |
| | | | | 375/340 |
| 2012/0210154 | A1* | 8/2012 | Hartwich | H04L 12/40039 |
| | | | | 713/323 |
| 2012/0271975 | A1 | 10/2012 | Elend | |
| 2013/0034132 | A1* | 2/2013 | Kaneko | H04L 12/40039 |
| | | | | 375/219 |
| 2013/0073757 | A1* | 3/2013 | Rettig | G06F 13/36 |
| | | | | 710/106 |
| 2013/0083611 | A1* | 4/2013 | Ware | G06F 3/0625 |
| | | | | 365/191 |
| 2014/0365693 | A1* | 12/2014 | Monroe | H04L 12/40032 |
| | | | | 710/105 |
| 2015/0117578 | A1* | 4/2015 | Li | H04L 7/044 |
| | | | | 375/355 |
| 2016/0112223 | A1* | 4/2016 | Kitsukawa | H04L 25/08 |
| | | | | 375/346 |
| 2018/0089120 | A1* | 3/2018 | Riekstins | G06F 13/364 |
| 2018/0285292 | A1* | 10/2018 | Amarilio | G06F 1/32 |
| 2019/0222790 | A1* | 7/2019 | Fujiki | H04N 5/44 |
| 2019/0294572 | A1 | 9/2019 | Rennig et al. | |
| 2020/0272589 | A1 | 8/2020 | Rennig et al. | |
| 2020/0389469 | A1* | 12/2020 | Litichever | H04L 63/1425 |
| 2021/0034134 | A1* | 2/2021 | Yu | B60L 1/00 |
| 2021/0073167 | A1 | 3/2021 | Dehamel | |
| 2021/0203682 | A1* | 7/2021 | Bajpai | H04L 67/12 |

OTHER PUBLICATIONS

"TCAN 1042 Fault Protected CAN Transceiver with CAN FD Datasheet", Texas Instruments, May 2017.*

Definition of "active", Dictionary.com, retrieved from <https://www.dictionary.com/browse/active> on Mar. 14, 2023.*

Hell, M.-M., "The new wake-up pattern for a robust system," Proceedings ICC 2017, Mar. 7, 2017, 5 pages.

* cited by examiner

APPARATUS AND METHOD FOR COMMUNICATION ON A SERIAL BUS

CROSS-REFERENCE TO RELATED APPLICATIONS

This application claims the benefit of French Application No. 1909970, filed on Sep. 10, 2019, which application is hereby incorporated herein by reference.

TECHNICAL FIELD

The present disclosure relates generally to electronic devices and methods, and in particular to a device intended to be coupled to a serial bus, and method of operating thereof.

BACKGROUND

Certain applications, in particular in the automobile industry, comprise numerous devices, such as computing units, sensors, etc., coupled with one another by a serial bus such as a controller area network (CAN) bus. These devices communicate with one another via the CAN bus. In comparison with other communication couplings, the coupling via a CAN bus allows the number of cables used to be reduced.

SUMMARY

One embodiment addresses all or some of the drawbacks of known devices intended to be coupled to a serial bus.

One embodiment allows communications between devices coupled to a CAN bus having different clocks to be synchronised.

One embodiment simplifies the manufacture of known devices intended to be coupled to a serial bus.

One embodiment addresses all or some of the drawbacks of known methods of communication via CAN bus.

One embodiment reduces the energy consumption of known devices intended to be coupled to a serial bus.

One embodiment addresses all or some of the drawbacks of known systems comprising devices coupled to a serial bus.

One embodiment simplifies the manufacture of known systems comprising devices coupled to a serial bus.

One embodiment reduces the energy consumption of known systems comprising devices coupled to a serial bus.

According to a first aspect, an embodiment provides a method comprising the steps of receiving edges conveyed by a serial bus and separated by multiples of a same duration; determining a measurement value of a ratio between a cycle time of a clock and the duration; and sending bits on the serial bus using the measurement value.

According to an embodiment, the reception of the edges takes place before the sending of the bits.

According to an embodiment, the method comprises the reception of data using the measurement value, the edges comprising edges between bits of the received data.

According to an embodiment, the method comprises the sending of an acknowledgement of receipt of the data using the measurement value.

According to an embodiment, the determination of the measurement value comprises the use of a stored value, preferably kept fixed during the sending of the bits.

According to an embodiment, the determination of the measurement value comprises the addition of a predetermined value and/or of a value calculated as a function of a temperature to the stored value.

According to an embodiment, the calculated value is extrapolated from a plurality of predefined pairs each comprising a temperature value and a value corresponding to the calculated value for the temperature value.

According to an embodiment, the determination of the measurement value comprises the determination of a first value representative of a sum of differences between the measurement value and an actual value of the ratio for the cycles of the clock comprised between the reception of two of the edges; and the subtraction of the first representative value from the stored value.

According to an embodiment, the method comprises, at each cycle of the clock, the integer-modulo addition of a second value representative of the measurement value to the content of a register, the determination of the first representative value being based on a difference in content of the register between reception times of the two of the edges.

According to an embodiment, the sending of each of the bits starts at a time at which the content of the register crosses a threshold.

According to an embodiment, keeping the stored value fixed is implemented by a multiplexer that provides the stored value, an input among a plurality of inputs of the multiplexer receiving the stored value, the input among a plurality of inputs being selected during the sending of the bits.

An embodiment provides a device configured to implement the above-defined method.

According to an embodiment, the device is intended to be connected to the serial bus and comprising the clock, the clock preferably being located in and on a semiconductor substrate.

According to an embodiment, the device is configured to have a sleep state and a wake state, and is configured in order that a passage from the sleep state to the wake state is triggered by a frame conveyed by the serial bus, the frame comprising at least two consecutive cycles of a dominant state followed by a recessive state, the recessive states and dominant states having further durations comprised between 2 and 5 times the duration.

An embodiment provides a system comprising a serial bus and one or more first devices as defined above.

According to an embodiment, the system comprises, coupled to the serial bus, a second device configured to send: first messages carrying a set of operations to be implemented by the first devices; and second messages addressed to a part of the first devices, the second messages conveying respective identifiers of the first devices to which the second messages are respectively addressed, the second messages requesting from the first devices to which they are addressed to send respective reactions towards the second device within respective expected time intervals. The first devices is configured to receive the first messages, read the set of operations to be implemented, and implement operations as a function of the read set; and receive the second messages, and react to the second messages by sending, within the respective expected time intervals, reactions towards the second device.

According to a second aspect, an embodiment provides a method of communication via serial bus, comprising the conveyance by the serial bus of a frame comprising at least two consecutive cycles of a dominant state followed by a recessive state, the recessive states and dominant states having durations comprised between 2 and 5 times the duration of a data bit conveyed by the serial bus, and preferably above 1.8 µs; and the detection by one or more circuits coupled to the serial bus of at least a part of the frame for triggering the passage from a sleep state to a wake state of the one or more circuits.

According to an embodiment, the circuit or each of the circuits comprises a clock.

According to an embodiment, for the circuit or each of the circuits, the clock is off when the circuit is in the sleep state.

According to an embodiment, the frame comprises at least one edge ending another dominant state preceding the dominant states, and the triggering of a starting of the clock by the edge.

According to an embodiment, the recessive states and dominant states all have the same duration.

An embodiment provides a system configured to implement the above-defined method.

An embodiment provides a first device intended to be connected to the serial bus of a system as defined above.

According to an embodiment, the first device is configured to receive edges conveyed by the serial bus and separated by multiples of a same duration; determine a measurement value of a ratio between a cycle time of the clock and the same duration; and receive bits on the serial bus using the measurement value.

According to an embodiment, the detection of at least a part of the frame is carried out based on the bits.

According to an embodiment, the first device is configured to send an acknowledgement of receipt of the frame using the measurement value.

According to an embodiment, the first device is configured to send data on the serial bus using the measurement value.

According to an embodiment, the first device is configured in order that the sending of the data is preceded by the reception of the bits.

According to an embodiment, the first device is configured to determine the measurement value using a stored value kept fixed during the sending of the data.

An embodiment provides a second device intended to be connected to the serial bus of a system as defined above, and configured to apply the frame on the serial bus.

According to an embodiment, the system comprises one or more first devices as defined above and a second device as defined above.

According to an embodiment, the second device is configured to send: first messages carrying a set of operations to be implemented by the first devices; and second messages addressed to a part of the first devices, the second messages conveying respective identifiers of the first devices to which the second messages are respectively addressed, the second messages requesting from the first devices to which they are addressed to send respective reactions towards the second device within respective expected time intervals, the first devices being configured to receive the first messages, read the set of operations to be implemented, and implement operations as a function of the read set; and receive the second messages, and react to the second messages by sending, within the respective expected time intervals, reactions towards the second device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may have identical structural, dimensional and material properties.

For the sake of clarity, only the operations and elements that are useful for an understanding of the described embodiments herein have been illustrated and described in detail. In particular, transceiver units, as well as data processing units are not illustrated, the described embodiments being compatible with known transceiver units and known data processing units.

Unless indicated otherwise, when reference is made to two elements that are connected together, this means a direct connection without any intermediate elements other than conductors, and when reference is made to two elements that are linked or coupled together, this means that these two elements can be connected or be linked or coupled by way of one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
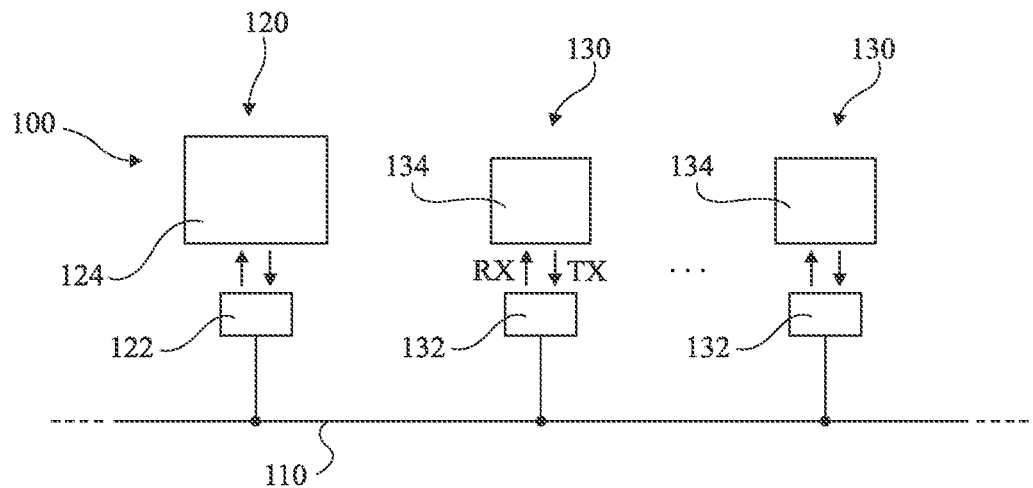
FIG. 1 illustrates, in a schematic fashion, a system comprising a serial bus and devices coupled to the bus, to which the described embodiments apply.

FIG. 1 illustrates, in a schematic fashion, a system 100, comprising a serial bus 110, a device 120 and a plurality of devices 130. The described embodiments apply to a system such as the system 100. Although a plurality of devices 130 are illustrated, the described embodiments are compatible with a single device 130.

The serial bus no is typically defined by two conductive wires. Preferably, the bus no is of the CAN type, typically defined by the standard ISO 11898. More preferably, the CAN bus is of the FD CAN (flexible data rate CAN) type.

The devices 120, 130 are coupled, preferably connected, to the bus 110. During operation, the devices 120 and 130 communicate data to each other via the bus 110. For this purpose, the devices send and/or receive data conveyed via the bus 110. Preferably, for transmitting data, each device sends one or more frames. By frame, a succession of bits arranged in accordance with a predetermined order is understood. Each frame preferably comprises at least one start-of-frame bit and more than one end-of-frame bits. The bits of the data (or information) transmitted between devices are constituted by some of the bits of the frame. Each bit corresponds to a logic level of the bus during a duration TCAN (not illustrated in FIG. 1). By logic levels, two potential levels of the bus no are understood, preferably corresponding to respective recessive and dominant states of the CAN bus 110. The duration TCAN is typically comprised between approximately 0.1 and 2 μs, for example equal to 1 μs, which corresponds to a data rate that is lower than approximately 10 Mbits/s, for example equal to 1 Mbits/s.

Preferably, the method of communication implemented by the system 100 is orchestrated by the device 120, called the master device. The devices 130 are thus called slave devices. In particular, each slave device 130 sends data on the bus only after having received other data, sent by the master device 120, which indicate to it that it can, or must, send data. Preferably, each slave device 130 sends its data only in a time interval indicated by the mater device 120. The master device ensures that only one device 120, 130 sends data on the bus at a time. Thus, the transmission priorities are managed exclusively by the master device.

Preferably, the devices 120 and 130 implement a method such as described in Italian patent application number 102018000003980 (17-GRA-0844), filed on Mar. 26, 2018, incorporated herein by reference. Such a communication method comprises sending by the master device 120 of: first messages carrying a set of operations to be implemented by the slave devices 130; and second messages addressed to a part of the slave devices 130, the second messages conveying respective identifiers of the slave devices 130 to which the second messages are addressed. The second messages request from the slave devices 130 to which they are addressed to send respective reactions towards the master device 120 within respective expected time intervals.

The communication method further comprises implementing by the slave devices 130 of: receiving the first messages, reading the set of operations to be implemented, and implementing operations as a function of the read set; and receiving the second messages, and reacting to the second messages by sending, within the respective expected time intervals, reactions towards the master device 120.

Each device 120, 130 typically comprises a transceiver unit, respectively 122, 132, for transmitting and receiving data, and a circuit, respectively 124, 134. More specifically, the transceiver unit 122, 132 couples the circuit 124, 134 to the bus no. Preferably, the transceiver unit 122, 132 is connected to the circuit 124, 134 and to the bus no, i.e. the unit 122, 132 connects the circuit 124, 134 to the bus no. During operation, the transceiver unit 122, 132 provides to the circuit 124, 134 a signal RX conveying the logic levels of the bus, for example the signal RX is high for a recessive state of the bus and low for a dominant state of the bus. In order to send data, the circuit 124, 134 sends a signal TX conveying the logic levels to be applied to the bus.

Figure 2:
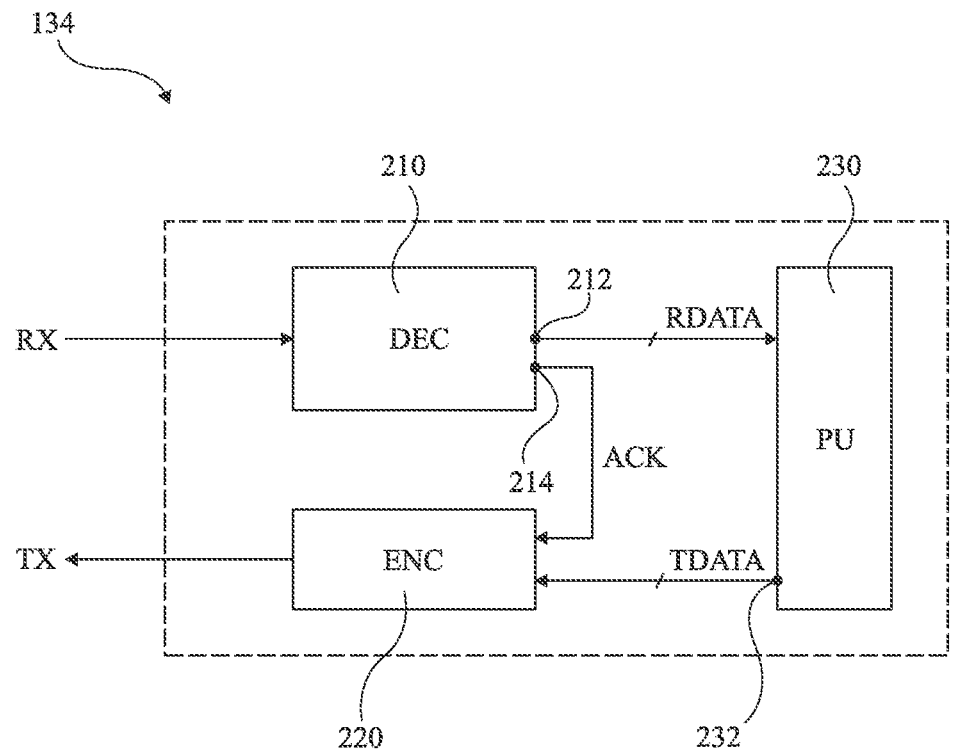
FIG. 2 illustrates, in a schematic fashion, an example circuit of a device to which the described embodiments apply.

FIG. 2 illustrates, in a schematic fashion, an example circuit 134 of a device 130 as described in relation to FIG. 1 to which the described embodiments apply. More specifically, the device 130 is intended to be coupled to the bus 110, i.e. the device 130 defines a circuit configured to operate when it is coupled to the bus 110.

The circuit 134 comprises a decoder circuit 210 (DEC). During operation, the decoder circuit 210 receives the signal RX and provides data RDATA on an output 212. The data RDATA correspond to data transmitted by the bus 110, typically data extracted by the decoder circuit 210 from one or more frames conveyed by the bus 110. Preferably, the circuit 210 provides, on an output 214, an acknowledgement of receipt ACK at the end of each received frame.

The circuit 134 comprises a data processing unit 230 (PU). The processing unit is coupled, preferably connected, to the output 212 of the decoder circuit 210. During operation, the processing unit 230 receives the data RDATA and/or provides data TDATA on an output 232. The processing unit 230 corresponds to any conventional circuit using data transmitted by a bus and/or providing data to be transmitted by a bus. The processing unit 230 is typically configured to carry out a logical and/or digital processing of the data. The processing unit 230 can further be coupled to one or more sensors and/or actuators, not illustrated. In a preferred example, the processing unit is coupled to light-emitting diodes of LED lights of a vehicle. The processing unit 230 allows various visual effects of the LED lights to be controlled. The processing unit 230 can comprise a circuit for processing the data sequentially, such as a microprocessor.

The circuit 134 comprises an encoder circuit 220 (ENC). The encoder circuit 220 is coupled, preferably connected, to the output 232 of the processing unit 230. Preferably, the circuit 220 is further coupled, for example connected, to the output 214. During operation, the circuit 220 receives the data TDATA and provides the signal TX. Preferably, the circuit 220 encodes the data to be transmitted in one or more frames to be applied to the bus. Preferably, the circuit 220 receives the acknowledgement of receipt ACK. The circuit 220 sends this acknowledgement of receipt ACK on the bus by giving to the signal TX the one or more values of one or more bits corresponding to the acknowledgement of receipt ACK, for example at the end of the received frame.

Figure 3:
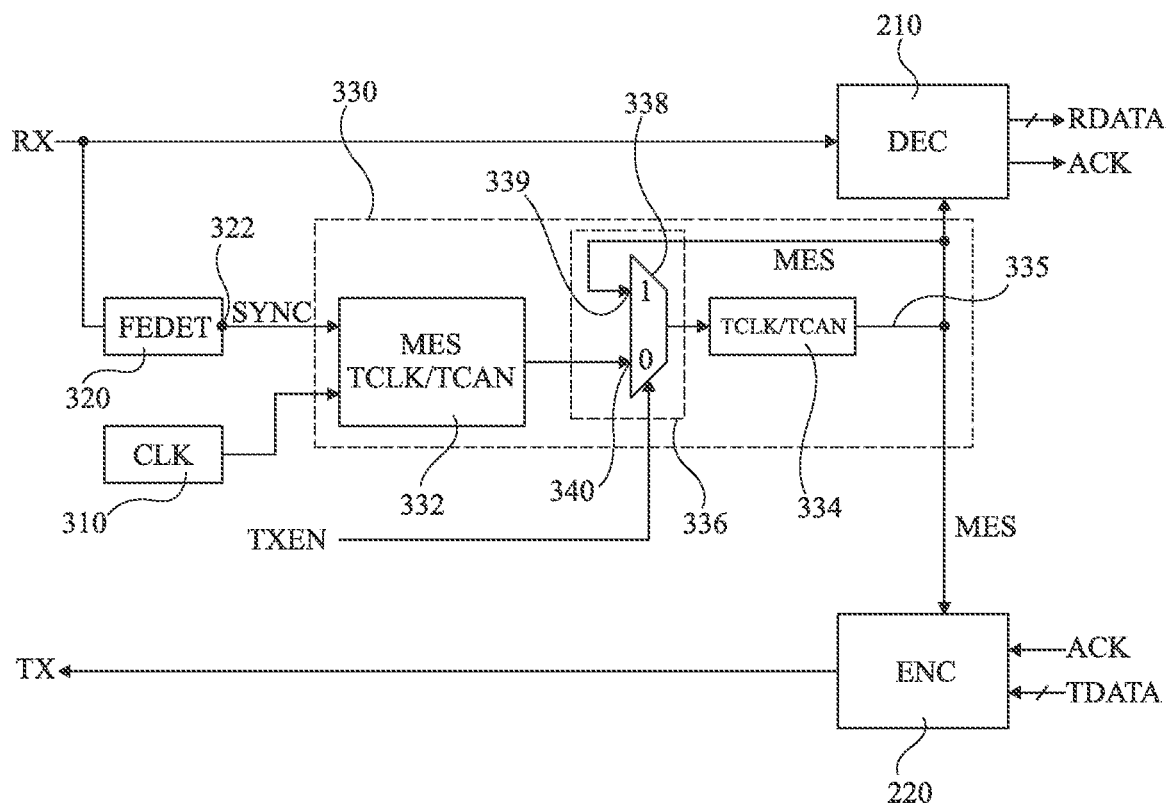
FIG. 3 illustrates, in a partial and schematic fashion, an embodiment, according to a first aspect, of a device intended to be coupled to a serial bus.

FIG. 3 illustrates, in a partial and schematic fashion, an embodiment, according to a first aspect, of a device 130 intended to be coupled to a CAN bus. In addition to the elements described in relation to FIG. 2, not described again here, the device 130 comprises a clock 310 (CLOCK), an edge detection circuit 320 (FEDET), and a circuit 330.

The clock 310 preferably has a cycle time TCLK (not illustrated), i.e. the duration of a cycle of the clock 310, or the inverse frequency of the clock 310, lower than the duration TCAN of the bits transmitted by the bus. The cycle time is the time that separates the successive rising edges, or the successive falling edges, of the clock 310. In a preferred example, the cycle time of the clock 310 is in the order of 32 times smaller than the duration TCAN.

The edge detection circuit 320 receives the signal RX, or, as a variant, a signal representative of the logic level of the bus. The edge detection circuit 320 is preferably configured to detect the falling edges only, i.e. the passages from the high logic level to the low logic level, or from the recessive state to the dominant state of the bus. As a variant, the edge detection circuit 320 is configured to detect the rising edges only or the rising and falling edges. However, compared to this variant, an advantage of the detection of the falling edges is that they are less sensitive to disruptions of the bus than the rising edges, thus making a more precise detection possible.

The circuit 320 provides, on an output 322, a signal SYNC. At each detected edge, the signal SYNC is, for example, set at a high logic level, for example during a cycle of the clock 310. The signal SYNC thus remains at a low logic level outside this cycle.

The detected edges typically correspond to the edges between bits of a frame conveyed by the bus from a further device coupled to the bus, preferably from the master device 120. Between two consecutive received edges, the frame comprises an integer number of bits having the same duration TCAN. The duration TCAN is based on a clock cycle time of the device at which the frame originated, preferably the clock cycle time of the master device. Thus, the received edges are separated by multiples of the duration TCAN, or integer multiples, i.e. the time separating the edges are the results of the product of the same duration TCAN by integer numbers.

The circuit 330 is coupled, preferably connected, to the output 322 of the circuit 320, and to the clock 310. During operation, the circuit 330 determines a measurement value of a ratio TCLK/TCAN between the cycle time TCLK of the clock 310 and the duration TCAN. By measurement value, a value representative of the measured TCLK/TCAN ratio is understood, i.e. of the TCLK/TCAN ratio determined during operation from the signal CLK provided by the clock 310 and from the time of reception of the edges detected, or received, by the circuit 320. Preferably, such a representative value is formed, with the exception of a possible constant, from a value linked to the TCLK/TCAN ratio measured by a scale or proportionality factor. In the illustrated example, the measured value is obtained during operation by a measurement circuit 332 (MES TCLK/TCAN) comprised in the circuit 330.

The circuit 330 has an output coupled, preferably connected, to the encoder circuit 220. During operation, the circuit 330 provides the measurement value to the encoder circuit 220. The encoder circuit 220 uses the measurement value to generate the signal TX corresponding to the bits sent by the transceiver unit 132. More specifically, the circuit 220 determines as a function of the measurement value the clock cycles at which the bits of the frame and/or the one or more acknowledgement-of-receipt bits are sent. In other words, the circuit 220 determines the sending start time of each bit as a function of the measurement value. The duration of each bit can thus correspond to the time separating the sending start times of consecutive bits. The sending start times can be determined so that the duration of each bit corresponds to the result of a division of the cycle time TCLK by the measured TCLK/TCAN ratio.

The cycle time TCLK of the clock 310 has thus been calibrated. Thus, the duration of the bits sent by the device 130 corresponds to the duration TCAN. This enables the device intended to receive these data, preferably, the master devices 120, to receive the sent data and/or the sent acknowledgement of receipt correctly. In other words, the communication via the CAN bus between the slave device 130 and the master device 120 has been synchronised, these devices having different clocks. As a variant, the duration of the sent bits can be different from the duration TCAN, for example a multiple or a sub-multiple of the duration TCAN.

Moreover, preferably, the clock 310 can be formed in and on a semiconductor substrate, for example a portion of semiconducting wafer, preferably made of silicon. In other words, the clock 310 may be constituted by components located in and on the substrate. These components can comprise resistors and capacitors. Such a clock is simpler to manufacture than a clock comprising a resonant crystal of the quartz type. In particular, such a clock can be manufactured by same steps as the other components of the device 130. The manufacture of the device 130 is thus simplified in comparison with a device comprising a quartz clock. In particular, this simplifies the manufacture of the system wo (FIG. 1).

Since the communication has been synchronised by using the measurement value of the TCLK/TCAN ratio for sending data bits and/or acknowledgement-of-receipt bits, problems stemming from a lack of synchronisation linked to frequency variations of the clock 310 of the slave device 130 are avoided. Such variations can be due to manufacturing dispersions and/or to the ageing, and/or to the temperature of the clock 310, in particular in a clock 310 located in and on a silicon substrate.

Preferably, the circuit 330 comprises a storage circuit 334. The circuit 334 stores the measurement value and provides the stored value MES on an output 335. According to an embodiment illustrated in FIG. 3, the circuit 334 is a circuit separate from the measurement circuit 332. The circuit 334 can be a flip-flop register controlled by the clock signal CLK. According to embodiments shown in the following figures, the circuit 334 is comprised in the measurement circuit 332. According to embodiments, the circuit 334 stores a further value representative of the TCLK/TCAN ratio, the further value allowing the measurement value to be obtained.

Preferably, the circuit 330 is configured to keep the value stored by the circuit 334 fixed. In other words, the circuit 330 comprises a circuit 336 configured in order that the value stored by the circuit 334 is not modified during the sending of the data. This allows the synchronisation to be improved.

According to an embodiment, the circuit 336 comprises a multiplexer 338 having its output coupled, preferably connected, to an input of the circuit 334. The multiplexer 338 has an input 339 coupled, preferably connected, to the output 335 of the circuit 334. The multiplexer 338 has a further input 340 which, in the illustrated embodiment, is coupled to the output of the measurement circuit 332.

During operation, the circuit 334 provides the stored value MES, for example the measurement value of the TCLK/TCAN ratio. The multiplexer receives a signal TXEN. The input 339 is selected from the inputs 339 and 340 during the sending of the data. For this purpose, the signal TXEN can be a control signal set at a high level (level 1) during the sending of the data and set at a low level (level 0) outside the sending of the data. The signal TXEN can also be any type of control signal activated during the sending of the data. Thus, during the sending of the data, the circuit 334 receives the stored value. This enables a fixed value stored in the circuit 334 to be maintained, in particular when the circuit 334 is a circuit that replaces, at each cycle of the clock 310, all or part of the value stored by the received value. Although a particular embodiment of the circuits 334 and 336 has been described, the circuits 334 and 336 can be formed by any circuit configured to store a value and to keep this value unaltered when the signal TXEN is received.

Figure 4:
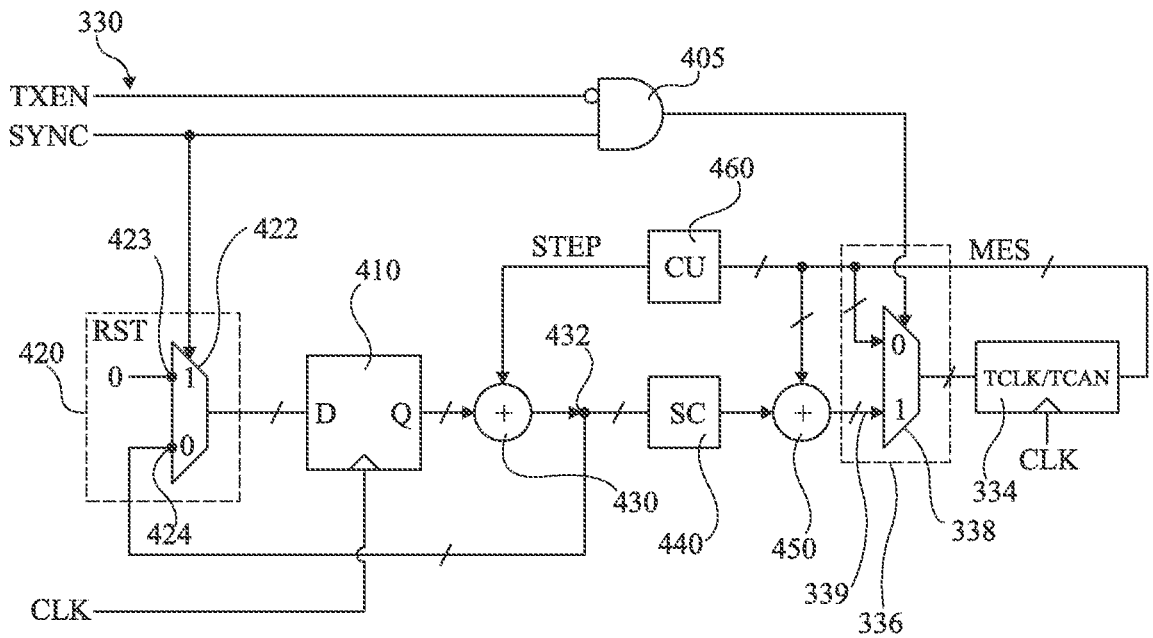
FIG. 4 illustrates, in a schematic fashion, an embodiment of a circuit of the device shown in FIG. 3.

FIG. 4 illustrates, in a schematic fashion, an embodiment of the circuit 330 of the device shown in FIG. 3.

In this embodiment, the storage circuit 334 and the maintaining circuit 336 for maintaining the stored value are comprised in the measurement circuit 332. More specifically, the control signal of the circuit 336 for maintaining the stored value is provided by an AND logic gate 405. The AND logic gate 405 receives, on an inverting input, the signal TXEN, and, on a non-inverting input, the signal SYNC. In the illustrated example of a maintaining circuit 336 comprising a multiplexer 338, the input 339 of the multiplexer is selected when the AND logic gate provides a high level (1), and the input 340 is selected otherwise. The circuit 334 is, for example, constituted by flip-flops controlled by the clock signal CLK. The stored value is a value representative MES of the measured TCLK/CAN ratio which is potentially different from the measurement value.

Besides the circuits 334 and 336, the circuit 330 comprises a register 410. The register 410 is preferably configured to have a content increased by an increment (STEP) at each cycle of the clock 310 (FIG. 3). This content can be constituted by the entirety of the register, or more preferably, by least significant bits of the register. More specifically, the content is increased modulo power of two the number of bits of the content in question. The increment STEP is preferably a value representative of the measurement value of the TCLK/TCAN ratio, for example constitutes the measurement value. Preferably, the increment STEP is provided by a computing circuit 460 (CU) coupled, preferably connected, to the output of the circuit 334.

In a preferred example, the register comprises twenty bits, and the content in question corresponds to the sixteen least significant bits of the register. Thus, at each cycle of the clock 310, the content is increased by an increment STEP modulo 0x10000. The prefix "0x" signifies that the characters that follow are in hexadecimal notation.

Preferably, the register 410 is constituted by synchronous flip-flops controlled by the clock signal CLK. The register 410 has its output (Q) coupled, preferably connected, to an adder circuit 430. The adder circuit 430 further receives the increment STEP. An output 432 of the adder circuit 430 is coupled to an input (D) of the register 410, preferably by way of a reset circuit 420 for resetting the register 410 (RST). This allows the content of the register 410 to be replaced, at each cycle of the clock 310, with the result of the addition by the circuit 430 of the content of the register and the increment STEP. As a variant, any circuit can be used which allows an increment to be added, modulo an integer, to the content of a register at each cycle of the clock 310.

Preferably, the reset circuit 420 for resetting the content of the register 410 comprises a multiplexer 422. The multiplexer is controlled by a reset control signal, this control signal being, in one embodiment, formed by the signal SYNC. The multiplexer 422 has an input 423 (1) selected when a reset of the register 410 is controlled by the signal SYNC. For example, when the signal SYNC is activated, i.e. at a high logic level, the input 423 is selected, i.e. the output of the multiplexer uses the value of the selected input 423. The multiplexer has a further input 424 (0) selected outside the resets. The input 423 receives the zero value comprising the bits of the register to be replaced for the reset. The input 424 is coupled, preferably connected, to the output 432 of the adder circuit 430. As a variant, the reset circuit 420 can be replaced by any circuit for initialising/reinitialising the content of the register 410 at a predetermined value potentially being different from zero.

Preferably, a second adder circuit 450 has an input coupled to the output of the first adder circuit 430, more preferably by way of a circuit 440 (SC). The adder circuit 450 has a further input which receives, for example, the stored value MES. The adder circuit 450 has its output coupled to the input of the circuit 334, preferably by way of the circuit 336. For example, the adder circuit 450 is coupled, preferably connected, to the input 339 of the multiplexer 338.

Figure 5:
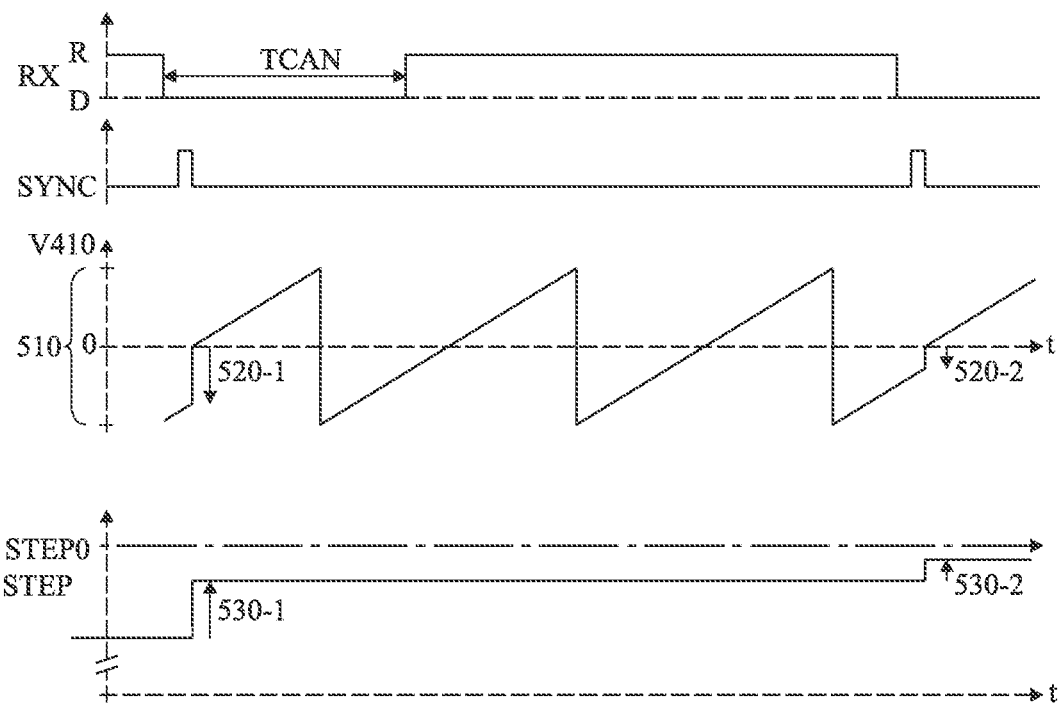
FIG. 5 illustrates, via schematic time charts, the operation of the circuit shown in FIG. 4.

FIG. 5 illustrates, via schematic time charts, an example of the operation of the circuit shown in FIG. 4. More specifically, FIG. 5 illustrates time charts of an example of the signal RX, of the signal SYNC, of the values V410 of the content in question of the register 410, and of the measurement value STEP, as a function of time t.

In this example, the signal RX has a first falling edge, then a dominant state ($D_0$) of a duration of one bit, then a recessive state (R) of a duration of two bits that ends with a second falling edge.

The signal SYNC has a high logic level during a clock cycle after the detection of each of the falling edges. The signal SYNC has a low logic level when no falling edge is detected.

In the illustrated example, in order to facilitate the understanding, the values V410 of the content of the register 410 are in signed representation, i.e. the most significant bit of the content in question corresponds to the sign bit. The values of the register 410 may also be in unsigned representation. In the example described above of a register 410 of twenty bits and a content formed from the 16 least significant bits, the value of the bit number 15 (beginning with 0 from the least significant bit) corresponds to the sign bit.

Each time the signal SYNC is at the high level, the value V410 is reset. The AND logic gate 405 allows the same circuit 336 to be used for keeping the stored value MES fixed during the sending of the data and during the determination of the measurement value outside the reception of the edges.

After the reset, the value V410 increases due to the addition of the increment STEP at each clock cycle. The increase is illustrated in a very schematic fashion and the successive additions are not portrayed. As the addition of the increment is modulo an integer, the value V410 scans more than once a range of values 510. The time invested for scanning the range of values 510 once is representative of the result of a division of the duration TCAN by the increment STEP.

In order to measure the TCLK/TCAN ratio, an attempt is made to give to the increment STEP, representing the measurement value of the TCLK/TCAN ratio, a value STEP0 representative of the actual ratio between the cycle time TCLK and the duration TCAN. The value STEP0 is preferably the value during which the value V410 scans the range of values 510 exactly once during the duration TCAN of a bit. Indeed, the ratio between the value STEP0 and the span of the range 510 is thus equal to what there actually is, during operation, between the cycle time TCLK of the clock 310 and the duration TCAN. As a variant, the value STEP0 can correspond to the scanning of the range exactly one integer number of times. The scanning can further be carried out in the direction opposite to the one illustrated, the value STEP0 being negative.

In the illustrated example, the value V410 has not scanned the range 510 exactly three times during the duration of three bits between the reception of the first edge and the reception of the second edge. More specifically, at the second edge, a value 520-2 of the sum of the increment STEP and the value V410 during the clock cycle preceding the reset, has a result different from zero, here a negative value. The value 520-2 corresponds to the accumulation of a difference, for the clock cycles between the first and second edges, between the increment STEP and the value STEP0. The difference is an algebraic value, i.e. can be positive or negative. A value 520-1 has also been illustrated that corresponds to the accumulation of the difference during the time separating the preceding edge, not illustrated, and the first edge.

At each received edge, the AND logic gate 405 requests the cessation of the maintaining of the value stored in the circuit 334. The stored value is replaced by the value that the adder circuit 450 provides. The value provided by the circuit 440 is by sign opposite that of the value 520-1, 520-2 received by the circuit 440. Thus, the circuit 450 subtracts from the increment STEP an algebraic value 530-1, 530-2 representative of the value 520-1, 520-2. As a variant, the circuit 450 is replaced by a subtracting circuit.

The value 530-1, 530-2 has the same sign as the respective value 520-1, 520-2. More specifically, the value 530-1, 530-2 provided by the circuit 440 corresponds to the sum 520-1, 520-2, multiplied by a constant chosen small enough for the subtraction of the value 530-1, 530-2 to reduce, as an absolute value, the difference between the increment STEP and the value STEP0. In particular, the circuit 440 is provided in order for this constant to reduce the difference between the increment STEP and the value STEP0 when the first and second edges are separated by a duration less than or equal to 10 times the duration TCAN of one bit. An example of such an operation of the circuit 440 is described below in relation to FIG. 9. As a CAN bus frame comprises at least one falling edge every 10 bits, this thus allows the increment STEP to be gradually brought closer to the value STEP0, as illustrated here. In other words, this allows the measurement value of the TCLK/TCAN ratio to be gradually brought closer to the actual value of the TCLK/TCAN ratio.

As a variant, one can count the number of cycles between two edges, and deduce the measurement value directly from the ratio between this cycle number and the average duration of one bit between the two edges. However, with respect to this variant, the circuit shown in FIG. 4 allows the measurement value to be determined easily without knowing in advance and/or without measuring the integer number of durations separating the consecutive falling edges. Moreover, compared to this variant, the circuit shown in FIG. 4 is more robust vis-à-vis potential disturbances causing, for example, parasitic edges or shifts of the times at which the edges are detected.

Figure 6:
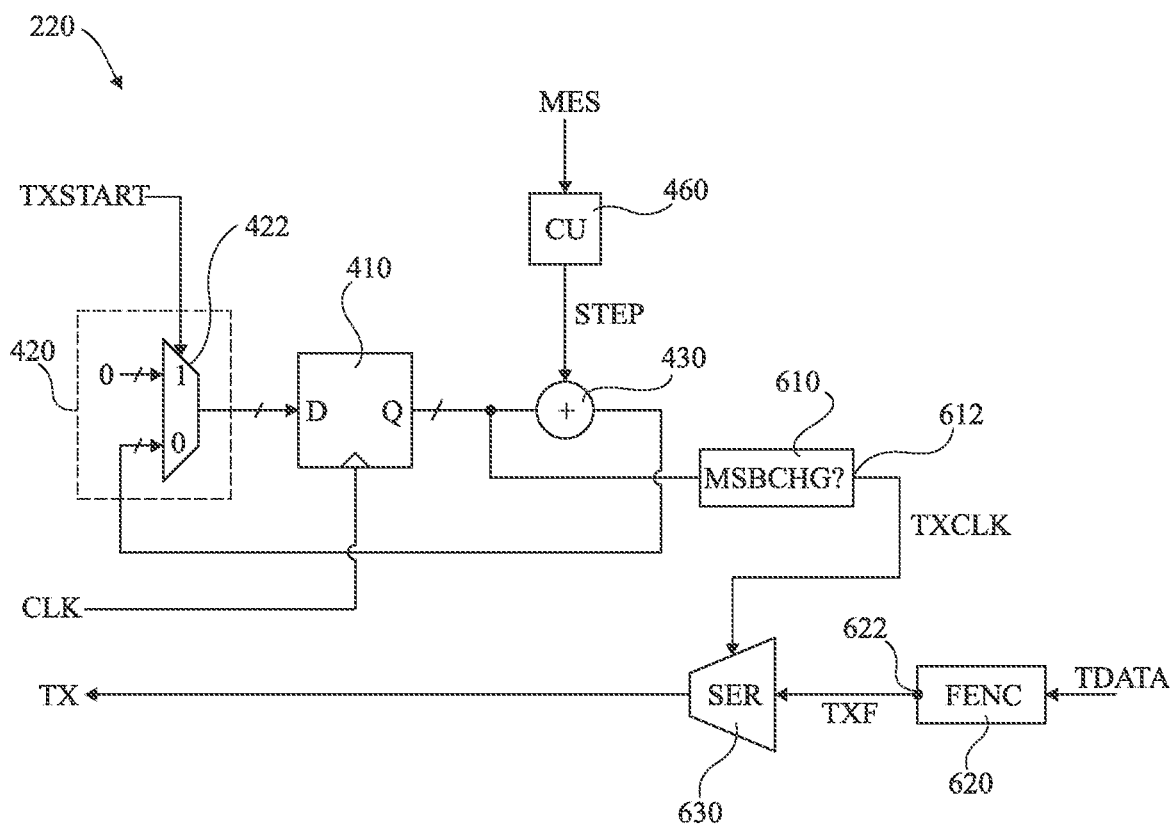
FIG. 6 illustrates, in a schematic fashion, an embodiment of a further circuit of the device shown in FIG. 3.
Figure 7:
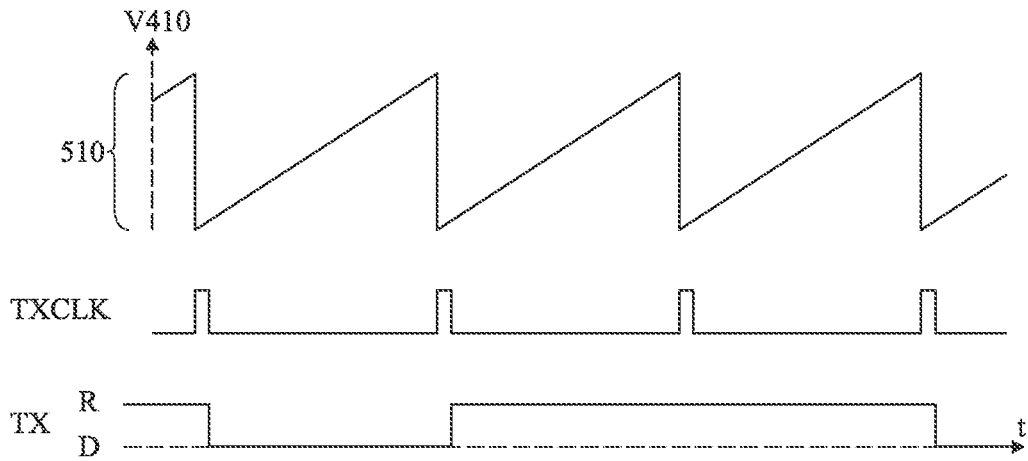
FIG. 7 illustrates, via schematic time charts, the operation of the circuit shown in FIG. 6.

FIG. 6 illustrates, in a schematic fashion, an embodiment of the encoder circuit 220 of the device shown in FIG. 3. FIG. 7 illustrates, via schematic time charts, the operation of the circuit shown in FIG. 6.

The encoder circuit 220 uses circuits identical or similar to the reset circuit 420, to the register 410, to the adder circuit 430 and to the computing circuit 460 (CU), of the circuit 330 shown in FIG. 4, with the difference that the reset circuit 420 is controlled by a signal TXSTART. The signal TXSTART requests the reset of the register 410 by the circuit 420 during a clock cycle at the beginning of the sending of a data frame. The reset circuit 420, the register 410, the adder circuit 430, and/or the computing circuit 460 can be separate from those of the circuit 330, or, as in the preferred embodiment shown in FIG. 8 further down, shared with the circuit 330. The value V410 of the content of the register as a function of time t is illustrated schematically in FIG. 7.

The encoder circuit 220 further comprises a circuit 610 (MSBCHG?) coupled, preferably connected, to the output (Q) of the register 410. The circuit 610 detects the crossing of a threshold by the content of the register 410. In the preferred example where the content corresponds to the 16 least significant bits of a register of 20 bits, this crossing corresponds to a value change of one of the most significant bits MSB of the register. The threshold thus corresponds, in this example, to a zero value of the content in question. As a variant, one can use any threshold value, chosen as a function of the synchronisation and/or of a duration between the reset request by the signal TXSTART and the sending of the frame. A crossing occurs at each scanning of the range 510 by the value V410 of the content in question; the consecutive crossings are separated by the duration of the scanning of the range.

The circuit 610 provides a signal TXCLK on its output 612. An example signal TXCLK is illustrated schematically as a function of time t in FIG. 7. Preferably, when the crossing is detected, the signal TXCLK adopts a first logic level, for example a high level, and remains at a low level when no signal is detected. As a variant, the signal TXCLK can be constituted by any signal allowing information regarding a threshold crossing by the content of the register 410 to be transmitted.

The circuit 220 further comprises a circuit 620 (FENC) that receives the data TDATA. The circuit 620 provides at its output 622 a frame TXF formed from the data TDATA, i.e. encodes the data TDATA in the form of the frame TXF. The circuit 220 further comprises a serialising circuit 630 (SER) coupled, preferably connected, to the outputs 612 and 622. The circuit 630 receives the frame TXF and puts the data in series, synchronised by the signal TXCLK. The circuit 630 provides the signal TX, illustrated in FIG. 7, corresponding to applications of recessive (R) and dominant ($D_0$) levels to the bus in the order of the bits of the frame TXF. Each bit has the duration of the scanning of the range 510.

The sending of the sent bits has thus been synchronised with respect to the duration TCAN of the bits received previously. In particular, the preferred case where the device 130 is a slave device and can send data only after having received a frame from the master device 120 (FIG. 1) makes it possible to ensure that data have been received by the device 130 before the sending of the data. Preferably, the time between, first, the end of the reception of the data frame from the master device permitting the sending of the data by the slave device, and, then, the beginning of the sending of the frame sent by the slave device, is less than 100 times the duration TCAN, more preferably less than 20 times the duration TCAN. By this means, it is possible to ensure that variations in the cycle time between the measurement of the TCLK/TCAN ratio and the use of the measurement value of this ratio remain small enough in order for the synchronisation to be sufficient to ensure the proper reception of the sent data.

Figure 8:
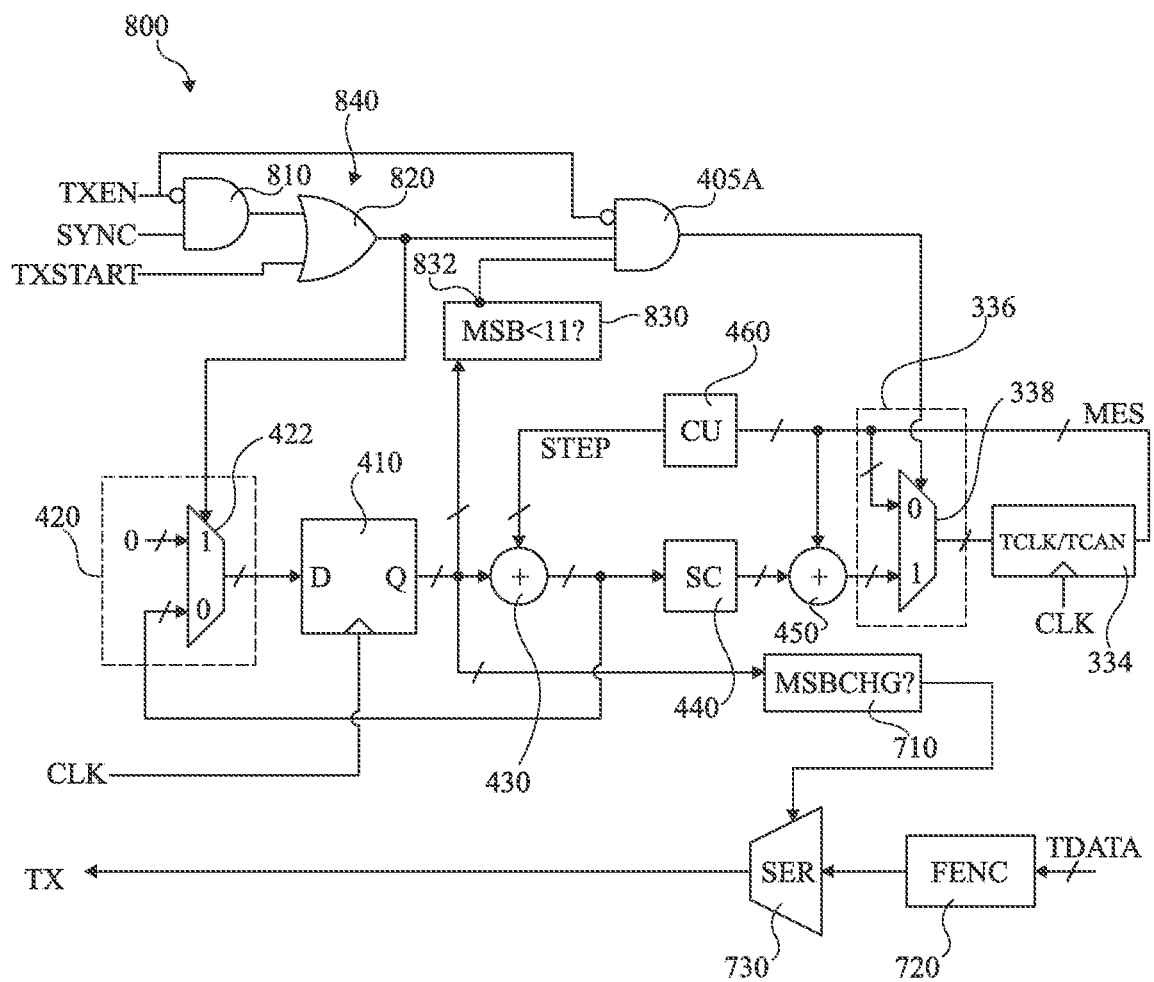
FIG. 8 illustrates, in a schematic fashion, a further embodiment of a circuit of the device shown in FIG. 3.

FIG. 8 illustrates, in a schematic fashion, an embodiment of a circuit 800 of the device shown in FIG. 3. More specifically, the circuit 800 comprises a circuit 330 identical or similar to the circuit 330 shown in FIG. 4, and a circuit 220 identical or similar to the circuit 220 shown in FIG. 6, in which the reset circuits 420, the register 410, the adder circuit 430 and the computing circuit 460 (CU) are shared by the circuits 330 and 220.

The circuit 800 comprises an AND logic gate 810 which receives, on an inverting input, the signal TXEN. The AND logic gate 810 receives, on a non-inverting input, the signal SYNC. An OR logic gate 820 has an input which receives the signal TXSTART and an input coupled, preferably connected, to the output of the AND logic gate 810. The reset circuit 420 is coupled, preferably connected, to the output of the OR logic gate 820. The OR logic gate 820 provides the control signal from the reset circuit 420.

The logic circuit 840 constituted by the AND logic gate 810 and OR logic gate 820 allows the reset of the register 410 to be requested when the signal TXSTART corresponds to the beginning of a sending of a frame on the bus, and the reset of the register 410 to be requested when the signal SYNC corresponds to the detection of a falling edge and the signal TXEN does not correspond to a sending of a frame in progress. The logic circuit 840 allows the register 410 to be shared for the sending of the frames and for the determination of the measurement value of the TCLK/TCAN ratio. An advantage of the present embodiment is thus that the circuit 800 comprises fewer components, is more compact and uses less surface area than embodiments in which the circuits 220 and 330 do not share their components.

Preferably, the AND logic gate 405 of the circuit 330 shown in FIG. 4 is replaced by an AND logic gate 405A. Like the AND logic gate 405 of the circuit 330 shown in FIG. 4, the AND logic gate 405A receives the signal TXEN on an inverting input; receives the signal SYNC, here by way of the gates 810 and 820, on a non-inverting input; and controls the circuit 336. The AND logic gate 405A further comprises an additional non-inverting input coupled to an output 832 of a circuit 830 (MSB<11?).

The circuit 830 provides, on the output 832, a high level when the number of scans of the value range of the content of the register 410, which is considered in order to determine the measurement value and to send the data, is less than or equal to ten. In the preferred example of a register 410 of twenty bits the considered content of which corresponds to the sixteen least significant bits, the four most significant bits correspond to this number of scans. It is thus ensured that, in order to determine the measurement value, separate received falling edges of more than ten bits are not taken into account.

Figure 9:
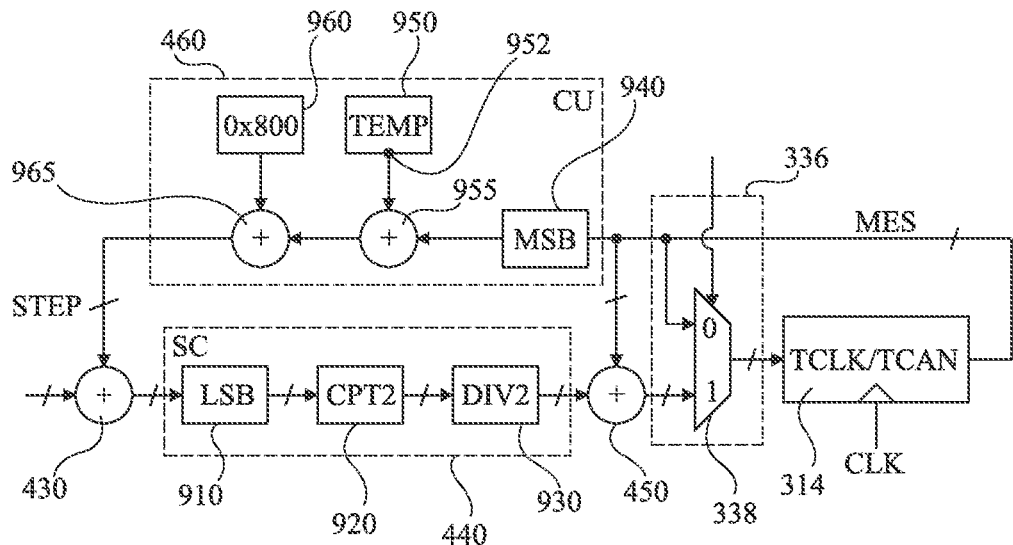
FIG. 9 illustrates, in a schematic fashion, a further embodiment of a circuit of the device shown in FIG. 3.

FIG. 9 illustrates, in a schematic fashion, an embodiment of a circuit of the device shown in FIG. 3. More specifically, the circuit illustrated in FIG. 9 corresponds to a part of a circuit 330 similar or identical to that shown in FIG. 4, comprising the adder circuits 430 and 450, the maintaining circuit 336, the storage circuit 314, and particular embodiments of the circuits 440 (SC) and 460 (CU). The storage circuit 314 is, according to the present embodiment, constituted by a register, for example of eighteen bits.

The circuit 440 comprises, in series successively from the adder circuit 430 to the adder circuit 450: an extraction circuit 910 for extracting content from the register 410, more specifically least significant bits LSB, for example the sixteen least significant bits from the twenty-bit register 410; a circuit 920 that provides on its output the opposite of the considered content of the register, more specifically the circuit 920 provides the two's complement CPT2 of the bits extracted by the circuit 910; and a multiplication circuit 930 for multiplying by a constant, allowing the increment STEP to be gradually brought closer to the value STEP0 in the manner described in relation to FIG. 5, preferably a division by two (DIV2) of the sixteen least significant bits (i.e. a shift to the right while retaining the sign bit).

The computing circuit 460 comprises, preferably, an extraction circuit 940 (MSB) for extracting most significant bits from the register 314. Preferably, the circuit 940 extracts the nine most significant bits. The circuit 940 is optional; however, compared to an embodiment in which this circuit is omitted, the circuit 940 allows the number of bits of the register 410 to be reduced while still retaining a precise stored value.

The computing circuit 460 comprises, preferably, a circuit 965 for adding a predetermined value 960, or constant value. In the preferred example of a ratio equal to approximately 32 between the duration TCAN and the cycle time, the predetermined value 960 is more preferably equal to 0x800, i.e. 32 times lower than the span 0x10000 of the range scanned by the content of the register 410 used for determining the measurement value. The value 960 can be chosen in a manner similar to other values of the ratio between the duration TCAN and the cycle time TCLK.

Thus, preferably, the computing circuit 460 for calculating the increment STEP from the stored value MES adds the predefined value 960 to the stored value. Compared to embodiments in which the circuit 965 is omitted, this allows the obtaining of a starting value of the increment STEP close to the actual value STEP0 of the TCLK/TCAN ratio to be facilitated. As a variant, the circuit 965 can be replaced by an initialising circuit for initialising at a non-zero value of the stored value MES.

The computing circuit 460 comprises, preferably, an adder circuit 955 coupled, preferably connected, to an output 952 of a circuit 950 (TEMP). The circuit 950 provides on its output 952 a value calculated as a function of the temperature of the device 130. The calculated value corresponds to a difference between the TCLK/TCAN ratio at the service temperature of the device 130 and the TCLK/TCAN ratio at a reference temperature.

The adder circuit 955 can have its output connected to the input of the circuit 965, as illustrated. The circuit 955 thus adds a value calculated by the circuit 950 to the stored value MES, preferably to the most significant bits of the stored value. As a variant, the adder circuits 955 and 965 can be swapped, the adder circuit 955 thus adding the value provided by the circuit 950 to the sum of the value 960 and the most significant bits of the stored value.

Thus, preferably, the computing circuit 460 for calculating the increment STEP from the stored value MES adds the value provided by the circuit 950 to the stored value. Compared to embodiments in which the circuits 950 and 955 are omitted, this allows the measurement value to remain closer to the actual value of the TCLK/TCAN ratio when the temperature varies, in particular in the absence of a reception of edges and/or during the sending of data frames.

Figure 10:
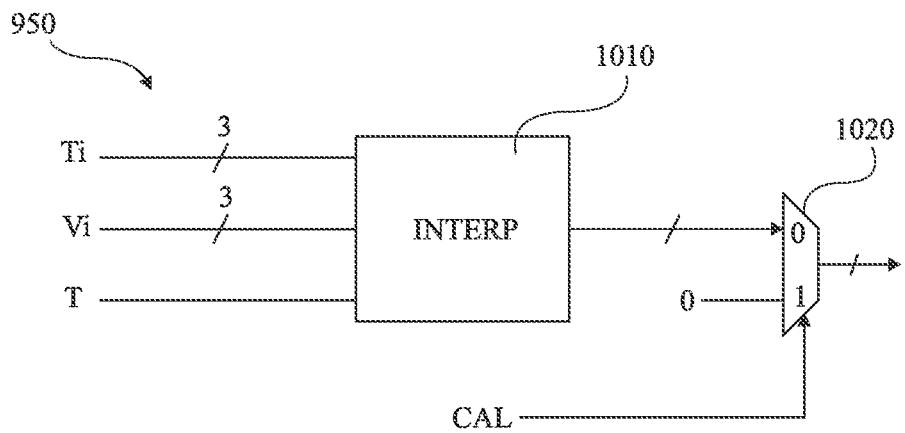
FIG. 10 illustrates, in a schematic fashion, an embodiment of a circuit of the circuit shown in FIG. 9.

FIG. 10 illustrates, in a schematic fashion, an embodiment of the circuit 950 of the circuit shown in FIG. 9.

For instance, the circuit 950 comprises a circuit 1010 (INTERP) which receives a measured temperature value T, three temperature values Ti and three values Vi respectively associated with the values Ti. In other words, the circuit 1010 receives three predetermined pairs each comprising one of the values Ti and the associated, or corresponding, value Vi. For each value Ti, the associated value Vi constitutes for example the value calculated by the circuit 950 when the measured temperature T is equal to the value Ti. When the measured temperature T is different from the values Ti, the calculated value is extrapolated from the temperature values Ti and the associated values Vi. Preferably, the circuit 1010 performs an interpolation, more preferably a linear interpolation, based on the values Ti and Vi.

This example is not limiting: the number of value pairs Ti and Vi can have any integer value greater than two, and the value calculated by the circuit 950 can thus be extrapolated in any conventional manner from the pairs.

Preferably, the output of the circuit 1010 is coupled to the adder circuit 955 by way of a multiplexer 1020. The multiplexer has an input (o) coupled, preferably connected, to the output of the interpolating circuit 1010. The multiplexer has a further input (1) which receives a zero value. The multiplexer 1020 has its output coupled, preferably connected, to the adder circuit 955. The multiplexer 1020 is controlled by a signal CAL. The multiplexer allows, when the signal CAL requests the selection of the input for receiving the zero value, the device to be used to obtain the values Vi from the measurement values of the TCLK/TCAN ratio, without using the circuit 1010. The values Vi have thus been calibrated. After calibration, the values Vi can thus be provided to the circuit 1010.

Figure 11:
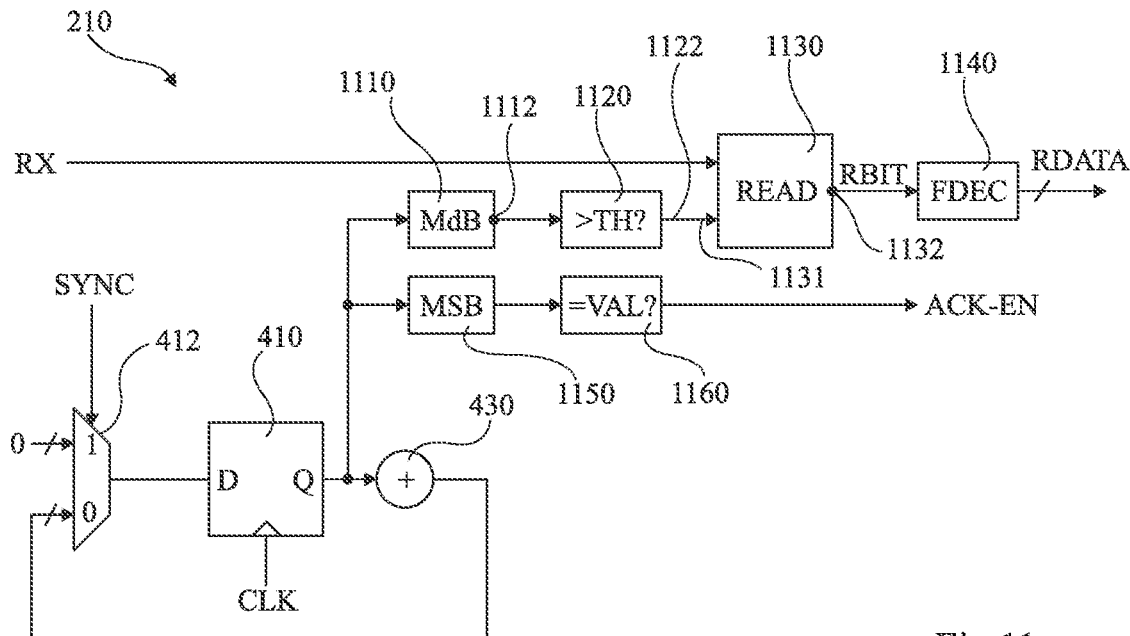
FIG. 11 illustrates, in a schematic fashion, an embodiment of a further circuit of the device shown in FIG. 3.

FIG. 11 illustrates, in a schematic fashion, an embodiment of the decoder circuit 210 of the device shown in FIG. 3.

The decoder circuit 210 uses circuits identical or similar to the reset circuits 420, to the register 410, to the adder circuit 430 of the circuit 330 shown in FIG. 4. The reset circuit 420, the register 410, the adder circuit 430, and/or the computing circuit 460 can be separate from those of the circuit 330, or, preferably, shared with the circuit 330. The register 410 has a content representing all or part of the register 410, this content repetitively scanning a value range in a manner similar to that described in relation to FIG. 5 by using the measurement value.

The decoder circuit 210 comprises, preferably, a circuit 1110 (MdB) coupled, preferably connected, to the output Q of the register 410. The circuit 1110 extracts most significant bits from the content of the register 410 preferably constituted by the 16 least significant bits of the register 410 of twenty bits. Preferably, the circuit extracts five bits, these bits more preferably having the numbers 11 to 15. The digital value corresponding to the extracted bits is provided on an output 1112 of the circuit 1110.

The decoder circuit 210 comprises a circuit 1120 (>TH?) coupled, preferably connected, to the output 1112 of the circuit 1110. The circuit 1120 detects the crossing of a threshold TH by the content of the register 410. Preferably, the circuit detects the crossing of the threshold TH by the value provided by the circuit 1110. The threshold TH is chosen so that the crossing of the threshold occurs after the beginning of each scanning by the value V410 (FIG. 5) of the content of the register 410 with a given lag between the beginning and the time of crossing the threshold. The circuit 1120 provides, on its output 1122, a detection signal for detecting a crossing of the threshold.

The decoder circuit 210 comprises a circuit 1130 (READ) which receives the signal RX and has an input 1131 coupled, preferably connected, to the output 1122. The circuit 1130 reads the logic level of the signal RX at each crossing of the threshold TH by the value V410. The circuit 1130 provides the read value, corresponding to a bit RBIT, on its output 1132. The bits RBIT are preferably those of a frame comprising the falling edges allowing the measurement value to be determined.

The decoder circuit 210 further comprises a frame decoder circuit 1140 (FDEC). The circuit 220 extracts the data RDATA from the succession of the bits RBIT of the frame. The measurement value of the TCLK/TCAN ratio is thus used to receive the data. A better synchronisation of the reception of the data results therefrom than in the absence of a use of the measurement value.

The decoder circuit 210 comprises, preferably, a circuit 1150 (MSB) coupled, preferably connected, to the output Q of the register 410. The circuit 1150 extracts most significant bits from the register, preferably bits different from those of the content used to determine the measurement value of the TCLK/TCAN ratio. Preferably, the extracted bits correspond to the four most significant bits of the register of twenty bits 410. These bits represent an integer number increased by 1 at each scanning of the value range by the content of the least significant bits. In other words, these bits count the number of scans from the beginning of the frame, and this number corresponds to the position of the bit received in the frame. The position of the bit is provided by the circuit 1150 on its output 1152.

The decoder circuit 210 comprises a circuit 1160 (=VAL?) coupled, preferably connected, to the output 1152 of the circuit 1150. The circuit 1160 compares the position of the bit received in the frame with a predetermined value. When the position and the value are equal, the circuit 1160 emits a signal ACK-EN. The signal ACK-EN is for example used with the signal TXCLK (FIG. 7) to obtain an acknowledgement of receipt ACK to be sent on the bus by the circuit 220 (FIG. 2). The measurement value of the TCLK/TCAN ratio has thus been used to emit the acknowledgement of receipt ACK. A better synchronisation results therefrom than if the acknowledgement of receipt is sent without using this value.

Figure 12:
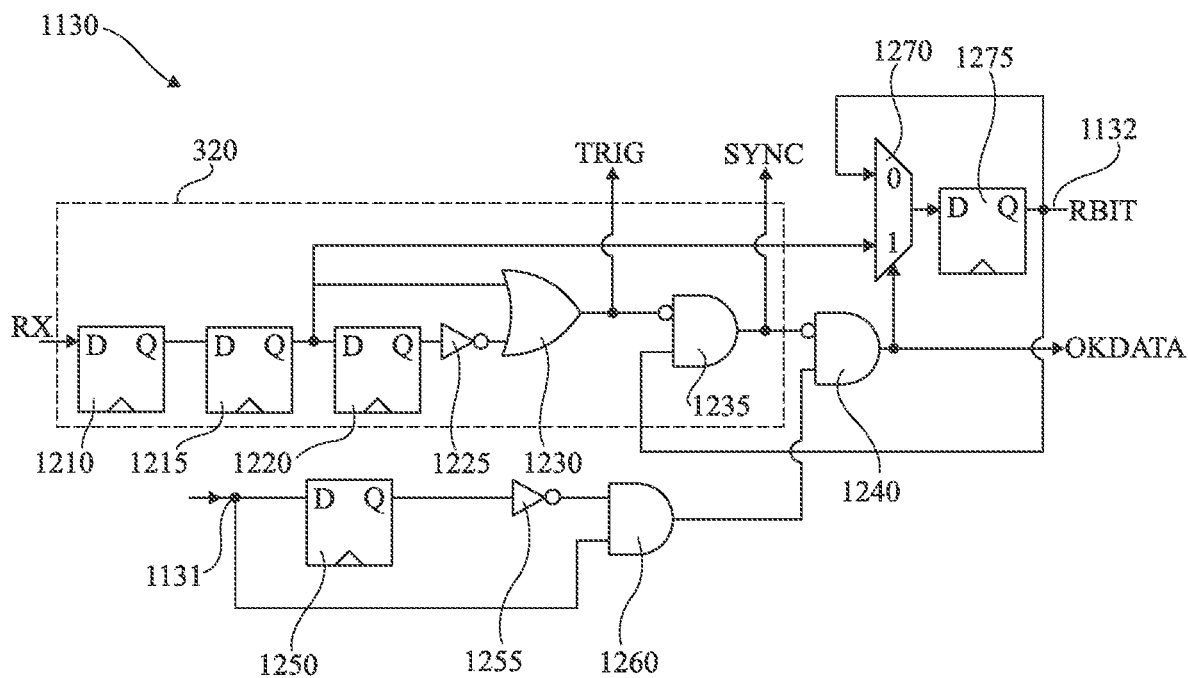
FIG. 12 illustrates, in a schematic fashion, an embodiment of a circuit of the circuit shown in FIG. 11.

FIG. 12 illustrates, in a schematic fashion, an embodiment of the circuit 1130 of the circuit 210 shown in FIG. 9. In particular, the circuit 1130 comprises flip-flops synchronised by the clock signal CLK, not illustrated.

The circuit 1130 comprises three successive flip flops 1210, 1215, 1222 in series, the flip flop 1210 receiving the signal RX on its input D. the flip flop 1220 has its output Q coupled by an inverter 1225 to an input of an OR logic gate 1230. The OR logic gate 1230 has a further input coupled, preferably connected, to the output Q of the flip flop 1215 and to the input of the flip flop 1220. The output of the OR gate 1230 is coupled, preferably connected, to an inverting input of an AND logic gate 1235. The AND logic gate 1235 has a non-inverting input coupled, preferably connected, to the output 1132 of the circuit 1130. Preferably, the flip flops 1210, 1215, 1220, the inverter 1225, and the logic gates 1230 and 1235 are shared with the edge detection circuit 320 (FIG. 3), the signal SYNC being provided by the AND logic gate 1235.

Preferably, the circuit 320 further provides a signal TRIG. The signal TRIG is provided by the OR logic gate 1230 in the present embodiment. The signal TRIG is preferably used in combination with the clock signal CLK for controlling the scanning of the range of values by the register 410 solely during the reception and sending of data. A part of the energy consumption is thus advantageously avoided by the register 410 outside of the sending and reception of data.

The circuit 1130 further comprises a flip flop 1250 the input D of which is coupled, preferably connected, to the input 1131 of the circuit 1130. The output Q of the flip flop 1250 is coupled, preferably connected, to an input of an AND logic gate 1260 by way of an inverter 1255.

The circuit 1130 further comprises an AND logic gate 1240 having an inverting input coupled, preferably connected, to the output of the logic gate 1235, and a non-inverting input coupled, preferably connected, to the output of the logic gate 1260.

A multiplexer 1270 has a control input coupled, preferably connected, to the output of the AND logic gate 1240. The multiplexer 1270 has a first input (1) coupled, preferably connected, to the output of the flip flop 1215. The first input is selected when the output of the AND logic gate 1240 is at a high logic level. The multiplexer 1270 has a second input (0) coupled, preferably connected, to the output 1132 of the circuit 1130. The second input is selected when the output of the AND logic gate 1240 is at a low logic level. The circuit 1130 further comprises a flip flop 1275 having its input D coupled, preferably connected, to the output of the multiplexer 1270. The output Q of the flip flop 1275 is coupled, preferably connected, to the output 1132 of the circuit 1130.

Preferably, the circuit 1140 (FIG. 11) has an input coupled, preferably connected, to the output of the logic gate 1240. During operation, the logic gate 1240 provides a signal OKDATA, received by the circuit 1140, which indicates to the circuit 1140 that a bit RBIT is available to the output 1132 of the circuit 1130.

Figure 13:
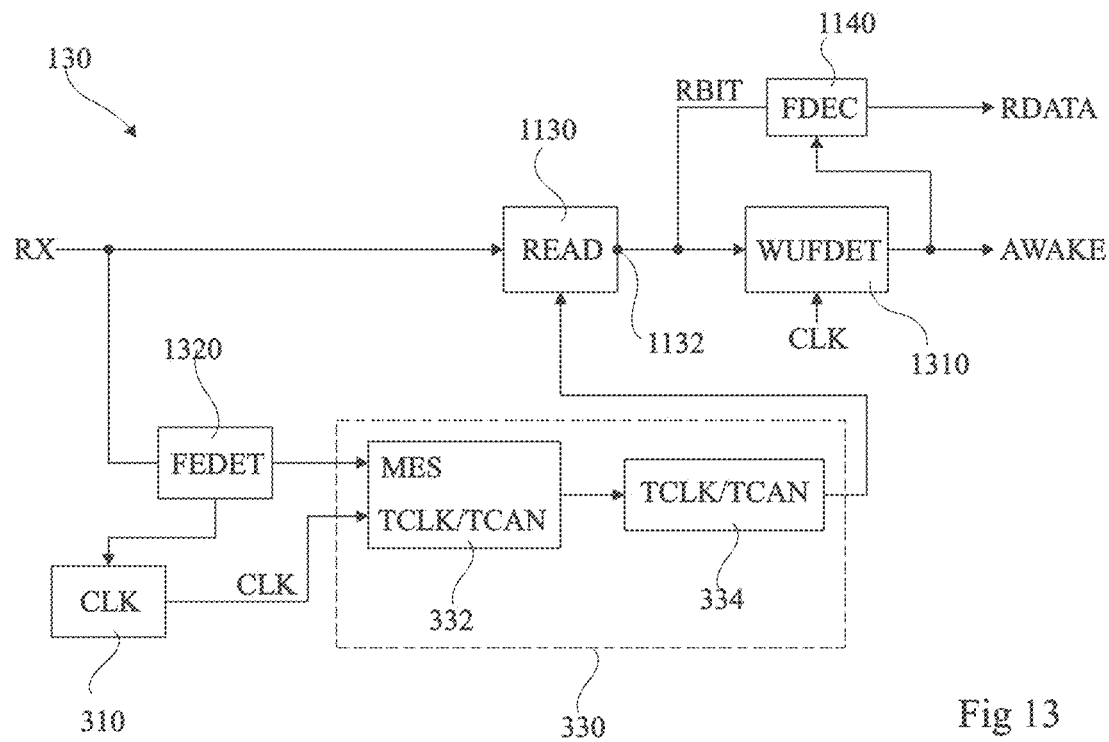
FIG. 13 illustrates, in a partial and schematic fashion, an embodiment, according to a second aspect, of a device intended to be coupled to a serial bus.

FIG. 13 illustrates, in a partial and schematic fashion, an example of an embodiment, according to a second aspect, of a device 130 constituting a circuit intended to be coupled to a CAN bus.

The circuit 130 is configured to have a sleep state and a wake state. The sleep state is defined by a state in which the electrical consumption by the circuit 130 is relatively low, and the wake state is defined by a state in which the electrical consumption by the circuit 130 is relatively high. The sleep state is obtained by reducing the activity, or by stopping the operation of at least a part of the circuits of the device 130. This allows the electrical consumption to be reduced compared with a device that is always in the wake state.

The circuit 130 comprises a clock 310 (CLOCK), similar to the one described in relation to FIG. 4. According to the present embodiment, the clock is off in the sleep state of the device. The clock thus does not produce any signal CLK, or the signal CLK remains at a same logic level during the sleep state.

The circuit 130 further comprises a detection circuit 1310 (WUFDET) for detecting a wake-up frame WUP. The circuit 1310 receives the clock signal CLK. The circuit 1310 emits a wake-up signal AWAKE when it has detected, i.e. recognised, the wake-up frame. The wake-up signal triggers the passage of the device from the sleep state to the wake state.

Preferably, the circuit 1310 has an input coupled, preferably connected, to the output 1132 of a circuit 1130 (READ), as described in relation to FIG. 11, which receives the signal RX and provides the successive bits RBIT of the frame.

Preferably, the circuit 130 comprises a circuit for determining a measurement value of the TCLK/TCAN ratio, according to the first aspect (FIGS. 3 to 12). The measurement value is preferably used, in the manner described in relation to the first aspect, for receiving the bits RBIT of the frame. As a variant, the circuit 1130 can use, for example on its input 1131 (FIG. 12), any signal allowing times of reception of the bits by the circuit 1130 to be defined. In a further variant, the circuit 1310 receives the signal RX directly and is configured to detect the wake-up frame WUP directly from the signal RX. However, compared with such variants, using the measurement value of the TCLK/TCAN ratio allows the reception of the wake-up frame to be synchronised and its detection to be improved.

The circuit 130 comprises a circuit 1320 that receives the signal RX. The circuit 1320 is an edge detection circuit 1320 (FEDET) for detecting edges, preferably falling edges, in the signal RX. In the illustrated example, the edge detection circuit 320 corresponds to the one described in relation to FIG. 3. Preferably, the edge detection circuit 1320 allows edges to be detected without using the signal CLK of the clock, and can be separate from the circuit 320. This allows edges to be detected when the device is in the sleep state. The circuit 1320 thus has an output coupled, preferably connected, to an input of the clock CLK. When an edge is detected, the circuit 1320 sends a signal to the clock 310, and the clock 310 is configured to start at the reception of this signal. Once the clock 310 has started, the signal CLK is used by the circuit 1310 to detect whether the detected edge belongs to a wake-up frame. Preferably, the signal CLK is further used for determining the measurement value of the TCLK/TCAN ratio.

Preferably, the circuit 130 further comprises a decoder circuit 1140 (FEDET), as described in relation to FIG. 11, for decoding successive bits RBIT of the frame, for producing data. More preferably, the circuit 1140 does not operate when the device is in the sleep state. The circuit 1140 thus receives the wake-up signal AWAKE, and the reception of this signal causes the starting of the circuit FDEC. The circuit 130 can then send data. The present embodiment can further be combined with the embodiments according to the first aspect of the encoder circuit 220 and of the sender circuits 1150 and 1160 (FIG. 11) for sending an acknowledgement of receipt.

Figure 14:
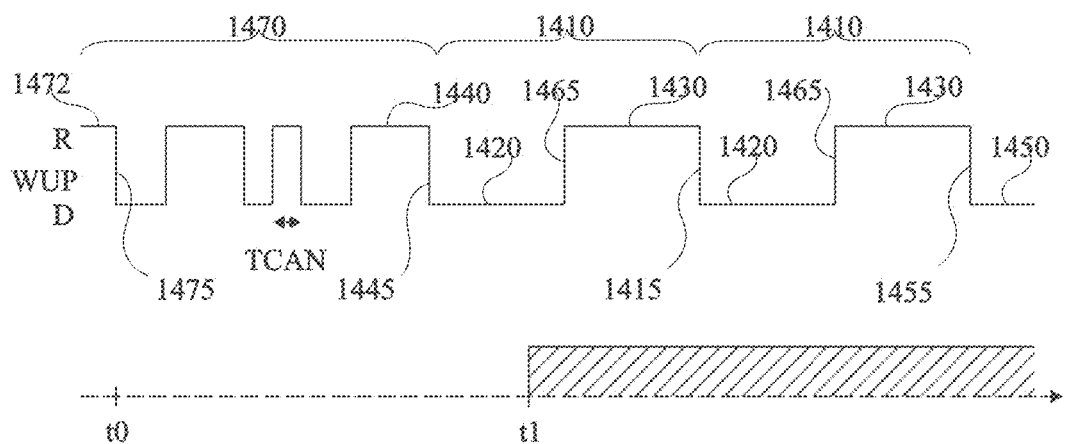
FIG. 14 illustrates, via schematic time charts, a step of an embodiment of a method of communication via a serial bus to which the device shown in FIG. 13 is coupled.

FIG. 14 illustrates, via schematic time charts, a step of an embodiment of a method of communication via a CAN bus to which the device shown in FIG. 13 is coupled. The dominant ($D_0$) and recessive (R) states of the wake-up frame WUP are illustrated as a function of time. Further illustrated, by hatched areas, are the times at which the clock started and provides the signal CLK.

The frame WUP is applied to the bus by a device coupled to the bus, preferably the master device 120. The frame WUP is preferably intended to trigger the passage from the sleep state to the wake state of all circuits 130 that are in the sleep state before the sending of the frame. The frame WUP is conveyed by the bus and reaches the circuits 130 coupled to the bus.

The wake-up frame WUP comprises at least two consecutive cycles 1410, each constituted by a dominant state 1420 followed by a recessive state 1430. By consecutive, it is understood that a same edge 1415 corresponds to the end of a cycle 1410 and to the beginning of the following cycle 1410. Each cycle has consecutively a sole dominant state 1420 and a sole recessive state 1430. The recessive states 1430 and dominant states 1420 of the cycles 1410 all have durations comprised between 2 times the duration TCAN of one data bit and 5 times the duration TCAN of one data bit conveyed by the serial bus. Preferably, the duration of each of the recessive states 1430 and the dominant states 1420 is equal to or greater than 1.8 µs. The duration of a dominant state corresponds to the time between a falling edge at the start of this dominant state, and a rising edge at the end of this dominant state. Likewise, the duration of a recessive state corresponds to the time between a rising edge at the start of this recessive state, and a falling edge at the end of this recessive state. In other words, the beginning of the cycle 1410 arriving first in the frame WUP corresponds to a falling edge 1445 at the end of a recessive state 1440 that precedes this first cycle. Likewise, the end of the cycle arriving last in the frame corresponds to a falling edge 1455 at the start of a dominant state 1450 following this last cycle.

Preferably, the recessive states 1430 and the dominant states 1420 all have the same duration. The recessive state 1440 can have a duration different from that of the recessive states 1430 and the dominant states 1420 of the cycles 1410. The dominant state 1450 can have a duration different from that of the recessive states 1430 and the dominant states 1420 of the cycles 1410.

The wake-up frame WUP thus forms at least three falling edges, namely the edges 1445, 1455, and at least one edge 1415. These falling edges are regularly alternated with at least two rising edges 1465, each between the dominant and recessive states of one of the cycles 1410.

Preferably, the cycles 1410 are preceded by a transmission period 1470 for transmitting the start bits of the frame, the cycles 1410 thus being located in the frame at data bit positions.

During the period 1470, or at the end of the same, the frame WUP comprises at least one falling edge 1475 following a further recessive state 1472 of the period 1470. The falling edge 1475 is detected by the circuit 1320 (FIG. 13), which triggers the starting of the clock 310 as of a time to.

In practice, the clock 310 takes time to start. The signal CLK is provided by the clock 310 only as of a time t1. The circuit 1310 (FIG. 12) is capable of detecting the recessive and dominant states of the frame only as of the time t1. The time t1 can be located after the beginning of the cycles 1410, and the circuit 1310 is thus not capable of recognizing a part of the dominant states 1430 and recessive states 1420 of the cycles 1410.

As the frame comprises a plurality of consecutive cycles 1410, even if the time t1 is located after the beginning of the cycles 1410, the circuit 1310 can recognise at least a part of the dominant states 1430 and recessive states 1420 of the cycles of the frame, and trigger the waking of the circuit 130.

It would have been conceivable to use a frame comprising fewer recessive states 1430 and/or dominant states 1420. However, in order to be able to stop the clock in the sleep state, it would have been necessary to provide a clock that starts before the beginning of these states. By comparison, the wake-up frame WUP comprising a plurality of cycles 1410 allows the clock 310 to be simpler, and simpler to manufacture, for example formed in and on a semiconductor substrate. The frame WUP can comprise only two cycles 1410. However, as a function of the chosen clock and of its start time, it can be preferable for the frame to comprise three or more than three consecutive cycles 1410, for example four or more than four consecutive cycles, preferably five or more than five consecutive cycles.

Moreover, in the preferred case where the circuit 130 is configured to determine the measurement value of the TCLK/TCAN ratio, the measurement value can advantageously be determined during the cycles 1410 following the start time ti of the signal CLK. The number of consecutive cycles of the frame can be chosen so that the determination of the measurement value can be carried out between the time ti and the end of the frame WUP. In the more preferred case where the circuit 130 comprises a circuit 220 that uses the measurement value to send data, the circuit 130 is, as of the end of the wake-up frame WUP, advantageously ready to send data that is synchronised with respect to the duration TCAN. The circuit can also send a synchronised acknowledgement of receipt of the frame WUP.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A method of communication via a serial bus, the method comprising:

receiving, by a circuit coupled to the serial bus, a frame having a data portion comprising at least two consecutive cycles, each cycle having a dominant state followed by a recessive state, and the recessive states and the dominant states having durations of between 2 and 5 times a data bit-duration of a data bit conveyed by the serial bus;

triggering a starting of a clock signal in the circuit based on an edge of the frame beginning a previous dominant state preceding the dominant states;

detecting, by the circuit using the clock signal, at least one cycle of the at least two consecutive cycles of the frame, the clock signal providing consecutive clock cycles to the circuit for a full duration of the at least one cycle of the at least two consecutive cycles of the frame, and the consecutive clock cycles starting after a beginning of the at least two consecutive cycles of the frame such the circuit does not recognize an initial part of the of the at least two consecutive cycles of the frame; and triggering, in response to the detecting, a transition from a sleep state to a wake state of the circuit.

2. The method according to claim 1, further comprising turning the clock signal off when the circuit is in the sleep state.

3. The method according to claim 1, wherein the recessive states and the dominant states all have a same duration.

4. The method according to claim 3, further comprising:

determining a measurement value of a ratio between a cycle time of the clock signal and the data bit-duration; and receiving bits on the serial bus using the measurement value.

5. The method according to claim 4, further comprising sending an acknowledgement of receipt of the frame using the measurement value.

6. The method according to claim 4, further comprising sending data on the serial bus using the measurement value.

7. The method according to claim 1, wherein the durations of the recessive states and the dominant states are greater than 1.8 μs.

8. A device configured to be connected to a serial bus, the device comprising:

a decoder configured to receive, from the serial bus, a frame having a data portion comprising at least two consecutive cycles, each cycle having a dominant state followed by a recessive state, and the recessive states and the dominant states having durations of between 2 and 5 times a data bit-duration of a data bit conveyed by the serial bus;

a clock configured to generate a clock signal;

an edge detection circuit configured to trigger a starting of the clock signal based on an edge of the frame beginning a previous dominant state preceding the dominant states; and a detector coupled to the decoder and the clock, and configured to:

detect, using the clock signal, at least one cycle of the at least two consecutive cycles of the frame, wherein the clock signal provides consecutive clock cycles to the detector for a full duration of the at least one cycle of the at least two consecutive cycles of the frame, and wherein the consecutive clock cycles start after a beginning of the at least two consecutive cycles of the frame such the detector does not recognize an initial part of the at least two consecutive cycles of the frame; and trigger, in response to the detecting, a transition of the device from a sleep state to a wake state.

9. The device according to claim 8, wherein the edge detection circuit is configured to receive edges conveyed by the serial bus and separated by multiples of a same duration, and wherein the device further comprises:
   a measurement circuit configured to determine a measurement value of a ratio between a cycle time of the clock signal and the data bit-duration; and
   a read circuit configured to receive bits on the serial bus using the measurement value.

10. The device according to claim 9, wherein the detector is further configured to detect the at least one cycle of the at least two consecutive cycles of the frame based on the bits.

11. The device according to claim 9, wherein the decoder is configured to send an acknowledgement of receipt of the frame using the measurement value.

12. The device according to claim 9, further comprising an encoder configured to send data on the serial bus using the measurement value.

13. The device according to claim 12, wherein the encoder is configured to send the data after the decoder receives the bits.

14. The device according to claim 12, wherein the measurement circuit is configured to determine the measurement value using a stored value kept fixed during the sending of the data.

15. The device according to claim 12, wherein the encoder is configured to send, on the serial bus, the frame.

16. The device according to claim 8, wherein the durations of the recessive states and the dominant states are greater than 1.8 µs.

17. A system comprising:
   a serial bus;
   a first device coupled to the serial bus, wherein the first device comprises:
      an encoder configured to send, on the serial bus, a frame having a data portion comprising at least two consecutive cycles, each cycle having a dominant state followed by a recessive state, and the recessive states and the dominant states having durations of between 2 and 5 times a data bit-duration of a data bit conveyed by the serial bus; and
   one or more second devices coupled to the serial bus, wherein each of the one or more second devices comprises:
      a decoder configured to receive, from the serial bus, the frame;
      a clock configured to generate a clock signal;
      an edge detection circuit configured to trigger a starting of the clock signal based on an edge of the frame beginning a previous dominant state preceding the dominant states; and
      a detector coupled to the decoder and the clock, and configured to:
         detect, using the clock signal, at least one cycle of the at least two consecutive cycles of the frame, wherein the clock signal provides consecutive clock cycles to the detector for a full duration of the at least one cycle of the at least two consecutive cycles of the frame, and wherein the consecutive clock cycles start after a beginning of the at least two consecutive cycles of the frame such the detector does not recognize an initial part of the at least two consecutive cycles of the frame; and
         trigger, in response to the detecting, a transition of the second device from a sleep state to a wake state.

18. The system of claim 17, wherein:
   the first device is configured to:
      send first messages carrying a set of operations to be implemented by the second devices; and
      send second messages addressed to the second devices, the second messages conveying respective identifiers of the second devices to which the second messages are respectively addressed, the second messages requesting from the second devices to which they are addressed to send respective reactions towards the first device within respective expected time intervals; and
   each of the one or more second devices is configured to:
      receive the first messages, read the set of operations to be implemented, and implement the operations as a function of the read set; and
      receive the second messages, and react to the second messages by sending, within the respective expected time intervals, reactions towards the first device.

* * * * *

UNITED STATES PATENT AND TRADEMARK OFFICE
CERTIFICATE OF CORRECTION

| | | |
|---|---|---|
| PATENT NO. | : 12,086,094 B2 | Page 1 of 1 |
| APPLICATION NO. | : 17/012984 | |
| DATED | : September 10, 2024 | |
| INVENTOR(S) | : Arnaud Dehamel | |

It is certified that error appears in the above-identified patent and that said Letters Patent is hereby corrected as shown below:

In the Claims

In Column 20, in Claim 1, Line 19, delete "of the of the" and insert -- of the --.

Signed and Sealed this
Fifth Day of November, 2024

Katherine Kelly Vidal
*Director of the United States Patent and Trademark Office*